P. T. HAMM.
TIRE CHAIN.
APPLICATION FILED JAN. 20, 1919.

1,325,321.  Patented Dec. 16, 1919.

Inventor
PHILLIP T. HAMM.

By Ralzemond A. Parker
Attorney

UNITED STATES PATENT OFFICE.

PHILLIP T. HAMM, OF DETROIT, MICHIGAN, ASSIGNOR OF ONE-THIRD TO FRANK C. HOSSIE AND HENRY WILD, BOTH OF DETROIT, MICHIGAN.

TIRE-CHAIN.

1,325,321.     Specification of Letters Patent.      Patented Dec. 16, 1919.

Application filed January 20, 1919. Serial No. 271,982.

*To all whom it may concern:*

Be it known that I, PHILLIP T. HAMM, a citizen of the United States, residing at Detroit, county of Wayne, State of Michigan, have invented a certain new and useful Improvement in Tire-Chains, and declare the following to be a full, clear, and exact description of the same, such as will enable others skilled in the art to which it pertains to make and use the same, reference being had to the accompanying drawings, which form a part of this specification.

My invention relates to anti-skid devices for tires commonly known as tire chains and used on the tires of motor vehicles to prevent slipping and skidding.

The object of my invention is to furnish an improved cross member for the tread, which consists of links that can be made from sheet metal blanks and sections of heavy wire or analogous material, shaped and connected as hereinafter described. Both the blanks and the wire sections are very simple and yet form a strong chain, at the same time affording a strong grip upon the road having a comparatively smooth and non-wearing surface upon the tire.

Figure 6:
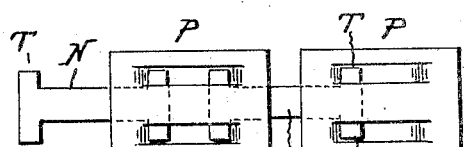
Figure 7:
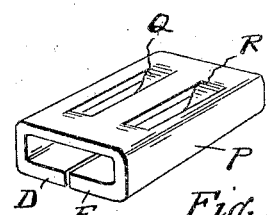
Figure 8:
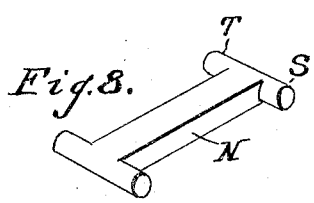

Figs. 6, 7 and 8 are figures of an alternate construction upon the same view in which links are employed of H-shape in the place of the bent wire links. Fig. 6 shows the manner of assembly. Fig. 7 shows one of the blocks which is made of sheet metal and punched ready to receive the wire links, and Fig. 8 shows one of the links in perspective.

Similar letters refer to similar parts.

Figure 1:
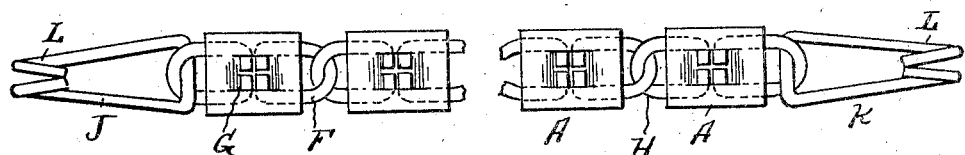
Figure 1 shows the appearance of the chain when assembled, a part thereof being broken away.
Figure 2:
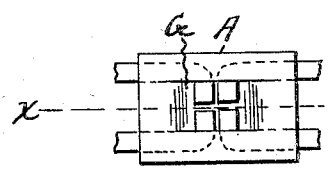
Fig. 2 shows a block or link composed of sheet metal and the ends of the wire clasped therein.
Figure 3:
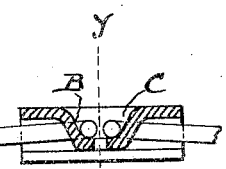
Fig. 3 is a section on the line X—X of Fig. 2.
Figure 4:
Fig. 4 is a cross section on the line Y—Y of Fig. 3.
Figure 5:
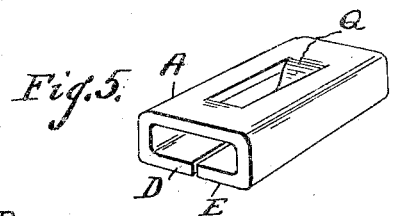
Fig. 5 is a perspective view of one of the sheet metal plates formed in shape.

Fig. 5 shows in perspective one of the completed links. This link is fashioned by punching out from the center of a sheet metal blank two lips B, C in the form shown in Fig. 3; downwardly bent tongues B and C of said sheet metal links are clasped by wire links F and G. These wire links which are caried in pairs hooked together as shown in Fig. 1 are looped over such downwardly projecting tongues connecting adjacent sheet metal links one to the other. Edges D and E of the sheet metal links are then turned downwardly and inwardly until they meet as shown in Fig. 5. This action completely closes such sheet metal links embracing the wire links F and G so they can not spread no matter what pull may be placed upon them. The wire links are each given, respectively, a certain amount of twist in the curved portion at H so that the assembled structures with the sheet metal part A, when united as shown at H, will lie flat or in the same plane. A sufficient number of these links are connected together in their formation so as to provide a chain as shown in Fig. 1. If used as cross chains in automobile practice two end pieces of stiff wire J and K are provided which may be linked to the side chains of the usual form and their ends L and M bent downward to grasp the side chains in the usual manner. These form no part of my invention which consists in the formation and assemblage of chains of the foregoing description. When used as cross chains by arranging each of these so that the joined edges D and E of the block or sheet metal part A is inward toward the surface of the tire, the tire contacts with the smooth surface only, the rough surface made by the punching at C being outward and tending to engage the surface of the road and thus assist in preventing slipping. In the alternative construction shown in Figs. 6, 7 and 8, an H-shaped link N is shown in Fig. 8 engaging a sheet metal part, P, in which there are two punchings with dependent lips, as shown at Q and R, in the perspective figure; the opposite depending lips are not shown. An integral link N is inserted between the parallel punched-out lips Q and R of sheet metal link P so that the oppositely directed ends of a cross-head of said link N impinge underneath said lips Q and R; the connecting link carried at the opposite end of said sheet metal link P being a duplicate of link N, is placed in position in like manner.

Edges D and E of said sheet metal link are then folded over in manner heretofore described to form a chain.

What I desire to claim is:

1. In an anti-skid chain, a tubular link which is rectangular in cross-section formed from an integral blank provided with internally dependent longitudinally opposed tongue portions punched therefrom, connecting links infolded by and carried at opposite ends of said tubular link by being looped over said tongue portions, the said connecting links carried by one tubular link engaging connecting links carried by adjacent tubular links so as to join the tubular links and form a chain.

2. In an anti-skid chain, a tubular link rectangular in cross-section formed from an integral blank, opposed longitudinally extending dependent tongue portions punched therein, a wire link carried by each of said tongue portions, wire links carried by adjacent tubular links articulating to form a chain.

3. In an anti-skid chain, a link formed from an integral blank comprising two internally dependent longitudinally opposed offset extensions, said blank being bent upon itself to form a tubular link, a wire link looped around said offset extension, wire links of adjacent tubular links connected together to form a chain.

In testimony whereof, I sign this specification.

PHILLIP T. HAMM.